US005970916A

United States Patent [19]

Yoder et al.

[11] Patent Number: 5,970,916

[45] Date of Patent: Oct. 26, 1999

[54] CLUMPING CELLULOSIC ANIMAL LITTER

[75] Inventors: Ricky Lee Yoder; Robert Vernon Wiedenhaft, both of Green Bay, Wis.

[73] Assignee: Thermo Fibergen, Inc., Walthan, Mass.

[21] Appl. No.: 09/072,231

[22] Filed: May 4, 1998

[51] Int. Cl.[6] ...................... A01K 1/01

[52] U.S. Cl. ...................... 119/173

[58] Field of Search ...................... 119/173, 172, 119/171; 502/80, 400, 401, 402, 403, 404, 405, 406, 407, 408, 409, 410, 411, 412

[56] References Cited

U.S. PATENT DOCUMENTS

| | | | |
|---|---|---|---|
| 4,405,354 | 9/1983 | Thomas, II et al. | 119/171 X |
| 4,532,890 | 8/1985 | Ohki et al. . | |
| 4,560,527 | 12/1985 | Harke et al. . | |
| 4,676,196 | 6/1987 | Lojek et al. . | |
| 4,727,824 | 3/1988 | Ducharme et al. . | |
| 4,844,010 | 7/1989 | Ducharme et al. . | |
| 4,881,490 | 11/1989 | Ducharme et al. . | |
| 4,883,021 | 11/1989 | Ducharme et al. . | |
| 4,949,672 | 8/1990 | Ratcliff et al. . | |
| 5,014,650 | 5/1991 | Sowle et al. . | |
| 5,016,568 | 5/1991 | Stanislowski et al. . | |
| 5,018,482 | 5/1991 | Stanislowski et al. . | |
| 5,094,190 | 3/1992 | Ratcliff et al. . | |
| 5,100,600 | 3/1992 | Keller et al. . | |
| 5,101,771 | 4/1992 | Goss . | |
| 5,135,743 | 8/1992 | Stanislowski et al. . | |
| 5,176,108 | 1/1993 | Jenkins et al. . | |
| 5,183,655 | 2/1993 | Stanislowski et al. . | |
| 5,188,064 | 2/1993 | House . | |
| 5,189,987 | 3/1993 | Stanislowski et al. . | |
| 5,193,489 | 3/1993 | Hardin . | |
| 5,207,830 | 5/1993 | Cowan et al. . | |
| 5,329,880 | 7/1994 | Pattengill et al. . | |
| 5,339,769 | 8/1994 | Toth et al. . | |
| 5,359,961 | 11/1994 | Goss et al. | 119/173 |
| 5,452,684 | 9/1995 | Elazier-Davis et al. . | |
| 5,458,091 | 10/1995 | Pattengill et al. . | |
| 5,577,463 | 11/1996 | Elazier-Davis et al. . | |
| 5,762,023 | 6/1998 | Carter | 119/173 |
| 5,901,661 | 5/1999 | Pattengill et al. | 119/173 |

*Primary Examiner*—Michael J. Carone
*Assistant Examiner*—Yvonne R. Abbott
*Attorney, Agent, or Firm*—Laff, Whitesel & Saret, Ltd.; Barry W. Sufrin

[57] ABSTRACT

Clumping cellulosic animal litter comprising a cellulosic substrate coated with a first layer of xanthan gum and a second layer of guar gum and a unique method of making such particles by applying water coatings between application of the two gum layers.

45 Claims, 1 Drawing Sheet

CLUMPING CELLULOSIC ANIMAL LITTER

BACKGROUND OF THE INVENTION

This invention relates generally to cellulosic animal litters and, more particularly, to clumping cellulosic animal litters made from specially treated agglomerated cellulosic particles.

Small domesticated animals, such as cats, are often trained to urinate and defecate in special containers commonly referred to as litter boxes. Untrained caged animals, such as guinea pigs, hamsters, gerbils, dogs, birds, monkeys, ferrets and laboratory mice and rats urinate and defecate on the floors of their cages. Therefore, pet owners, veterinarians and laboratory personnel line the bottoms of litter boxes and cages with absorbent material to collect the animals' urine and feces. In order to control objectionable odors from the contaminated absorbent material, it is necessary to periodically remove and dispose of that material and to replace it with fresh absorbent material.

Until recently, it was found to be necessary to completely remove contaminated absorbent material from the litter boxes and cages. However, now clay-based absorbents materials have been developed which, when wetted with animal urine, form coherent clumps that may be easily segregated and removed from the remaining uncontaminated absorbent material. These clay-based absorbents, which are generally referred to as "clumping litters", are far more efficient and convenient to use than prior absorbent materials. As a result, they have gained widespread commercial acceptance.

Unfortunately, clay-based absorbents have some drawbacks. First, they are dusty. Second, they are relatively expensive since they require that the clay be mined, processed, and often shipped long distances. The mining process is not only expensive, it can scar the landscape and is therefore environmentally undesirable. Also, different types of clay must be combined and treated in certain ways in order to achieve the desired clumping effect.

Substrates containing at least 10% by weight cellulosic content are a known alternative to clay-based absorbents for use in absorbing and disposing of animal urine and feces. When such cellulosic materials are made from waste produced in paper manufacture, they offer significant advantages over clay-based absorbents. First, the starting material is very inexpensive. Second, it is plentifully available and, once used and disposed of, the cellulosic component readily degrades, reducing the disposal problems inherent in the use of clay-based absorbents. Some particularly desirable methods of making cellulosic granules from paper waste are described in U.S. Pat. Nos. 4,560,527; 4,619,862; 4,621,011; and 4,721,059, which are incorporated herein by reference.

Although untreated cellulosic granules may form friable clumps, until the advent of the present invention, no practical method for making reliable and efficient clumping cellulosic absorbents was known. In the present invention, highly coherent clumps of cellulosic material are quickly formed when wetted by animal urine. Furthermore, the coherent clumps are easily maintained until removed. The present invention thus constitutes an important contribution to the animal litter art.

SUMMARY OF THE INVENTION

The present invention represents a substantial advance over clay-based clumping absorbents by providing cellulosic absorbents in the form of a plurality of coated cellulosic particles having a first or inner layer of xanthan gum and a second or outer layer of guar gum. Preferably, the amounts by weight of xanthan and guar gum in these two coatings will be approximately equal. This improved cellulosic absorbent preferably also includes a surfactant, as well as anti-microbial agents, fragrances and coloring agents. In the discussion above and that follows we refer to substrates containing at least 10% by weight cellulosic content as "cellulosic particles". However, it is preferred that the cellulosic particles used in the practice of this invention contain at least 40% by weight cellulosic content and most preferably at least 50% by weight cellulosic content.

The present invention also entails a unique process for making the above cellulosic particles in which the cellulosic particle substrate is wetted with water (either alone or in combination with adjuncts, as explained below) a first time before application of the adhesive layer and wetted with water (again, either alone or in combination with adjuncts, as explained below) a second time before application of the guar gum. In a preferred embodiment in which the moisture content of the final product before drying is minimized, the second wetting step uses a solution of one or more tackiness enhancing agents comprising natural water-soluble polymers with adhesive properties such as carboxymethylcellulose (CMC), methylcellulose, tapioca starch, xanthan gum, guar gum, guar gum derivatives, and karaya gum.

DETAILED DESCRIPTION OF THE PREFERRED EMBODIMENTS

Figure 1:
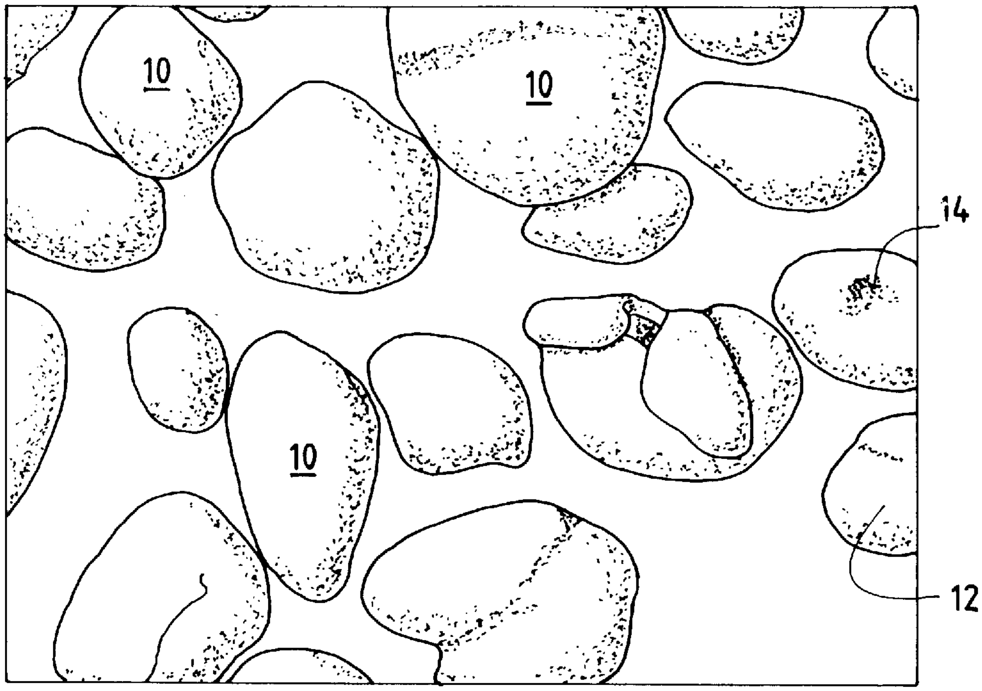
FIG. 1 is a photomicrograph of a group of loose particles prepared in accordance with the present invention at a magnification of about 10×.

The present invention comprises a particulate cellulosic substrate coated with a first or inner layer of xanthan gum which is adhered to the surface of the cellulosic particles and a second or outer layer of guar gum or guar gum derivatives which is in turn adhered to the xanthan gum-coated particles. It is key to the invention that the xanthan gum be coated onto the particulate cellulosic substrate rather than be present as a separate loose component of the litter. Also, it is preferred that the amounts by weight of xanthan and guar gum (or guar gum derivatives) in the inner and outer coatings be approximately equal.

As explained below, the cellulosic particles may be in pellet or granular form, although the granular form is greatly preferred, particularly when the litter is to be used with cats. Additionally, the particles may be treated with a surfactant, as well as with other adjuncts including anti-microbial agents, fragrances, coloring agents (pigments or dyes), and other adjuncts, as desired. Preferably, the surfactant as well as the other adjuncts will be applied before the xanthan and guar gum (or guar gum derivative) layers. In an alternative preferred embodiment, at least the surfactant and the fragrances will be applied, in an aqueous solution or suspension form, prior to the application of the guar gum layer.

The Particulate Cellulosic Substrate

The particulate cellulosic substrate may be prepared from plant fiber such as fiber from trees and plants, sugar beets, sugar cane, citrus pulp, potatoes, grains, peanut hulls, corn cob, tobacco stems, apple pumice, natural grasses, cotton, peat, etc. Preferably, it will be derived from wood pulp, citrus pulp, sugar cane, primary paper sludge, or a combination of primary and secondary paper sludge. In all cases, the particles should be no greater than about 4 mesh and preferably will be in the range of about 4 to 60 mesh. Particles in the range of about 12–20 mesh are particularly preferred when the absorbents are to be used with small animals such as cats, since particles in this size range reduce tracking from the litter box. The lengths of the cellulose fibers preferably will be less than about 10 mm, more preferably will be less than about 1 mm and most preferably will be less than about 0.3 mm.

Although the particles may be in granular, pellet or other forms, agglomerated granules are particularly preferred. Desirable methods of forming or agglomerating cellulosic granules are described in U.S. Pat. Nos. 5,560,527; 4,619,862; 4,621,011; 4,721,059 and 5,019,564 which are incorporated herein by reference. A particularly suitable agglomerated cellulosic granule made from primary and secondary sludge generated in the manufacture of virgin and recycled paper is available from GranTek, Inc. of Granger, Ind. under the trademark BIODAC®. BIODAC® granules comprise a cellulose complex consisting of about 47–53% by weight paper fiber, about 28–34% by weight of kaolin clay and about 14–20% by weight calcium carbonate, as well as minor amounts (less than about 1%) of titanium dioxide. BIODAC® granules are available in a variety of different mesh size ranges including 4/20, 8/30, 12/20, 16/30, and 20/50. Typical properties of these products are as follows:

based on the quantity and velocity of the cellulosic particles moving past the nozzles to produce a level of about 1 to 6% by weight moisture in the particles. In a preferred embodiment, about 1–2% moisture will be applied. Initially, most of this moisture will lie on the surface of the particles. The spray nozzles preferably are arranged in the device which is used to apply the xanthan gum, as discussed below.

Next, and preferably before more than about 15 seconds have passed from the application of the aqueous mist to the surface of the particles (i.e., before too much of the surface moisture is absorbed into the particles), xanthan gum is dusted onto the wetted cellulosic particles to produce a uniform coating. The surface moisture causes the xanthan gum to stick to the cellulosic particles. The xanthan gum is preferably in the form of a dry powder of less than about 80 mesh and preferably less than about 200 mesh in size. The amount of water used determines the amount of the xanthan gum which will adhere to the cellulosic particles ("pick-up"). The pick-up of the xanthan gum should range from about 0.025 to 5.0% by weight based on the weight of the underlying wetted cellulosic particles. A pick-up of about 1% by weight xanthan gum is preferred.

Next, a second layer of water is applied to the particles, which now carry the xanthan gum coating. As in the initial wetting of the particles, it is preferred that aqueous adjuncts be incorporated in the water. In a batch-type tumbling device, the water application can be done using the spray nozzles described earlier. In a continuous device, like an auger mixer, this would involve the use of a second set of spray nozzles positioned downstream of the first set that direct the water mist onto the advancing mass of xanthan

| BIODAC ® GRANULES | BULK DENSITY | MOISTURE CONTENT | pH | LIQUID HOLDING CAPACITY | SCREEN ANALYSIS |
|---|---|---|---|---|---|
| 4/20 | 41.0 ± 30 lbs/cft | Less than 5.% | 7.0–8.0% | 16–20% | +4 mesh <5.0%<br>4–20 mesh <90%<br>−30 mesh <1.0% |
| 8/30 | 41.0 ± 30 lbs/cft | Less than 5.% | 7.0–8.0% | 16–20% | +6 mesh <1.0%<br>8–30 mesh <90%<br>−40 mesh <1.0% |
| 12/20 | 42.0 ± 3.0 lbs/cft | Less than 5.% | 7.0–8.0% | 16–20% | +10 mesh <1.0%<br>12–20 mesh 80%<br>−40 mesh <1.0% |
| 16/30 | 43.0 ± 3.0 lbs/cft | Less than 5.% | 7.0–8.0% | 16–20% | +14 mesh <1.0%<br>16–30 mesh 90%<br>−40 mesh <1.0% |
| 20/50 | 45.0 ± 3.0 lbs/cft | Less than 5.% | 7.0–8.0% | 16–20% | +16 mesh <1.0%<br>20–50 mesh 90%<br>−60 mesh <1.0% |

Clumping Treatment

Proper application of the clumping treatment to the cellulosic particles which make up the litter substrate is critical. The cellulosic particles are first wetted with water which, in order to minimize moisture in the final product, preferably will include aqueous adjuncts such as antimicrobial agents, fragrances and coloring agents. They are then promptly dusted with the xanthan particles. This may be done, for example, using a drum coating device, such as a cement mixer or a horizontal coating drum, an auger mixer, a fluid bed mixer, a spray tower, a vibrating bed mixer, or other similar device known to those skilled in the coating arts. The use of an auger mixer is presently preferred. Also, both batch and continuous feed systems may be used. Continuous systems are currently preferred.

Spray nozzles are arranged to direct a fine water mist onto the moving bed or tumbling mass of particles at a flow rate gum-coated particles. This water spray causes the surface of the xanthan gum to become tacky. The feed rate of the moving or tumbling particles and the flow rate of the water spray are adjusted to apply about 0.25 to 2.0% by weight moisture to the xanthan gum-coated particles. Preferably, about 0.70 to 1.25% by weight water is applied.

In an alternative preferred embodiment, the moisture content of the final product can be minimized (to reduce or eliminate drying time and associated costs) by replacing the second water application with a solution of one or more tackiness-enhancing agents comprising natural water-soluble polymers with adhesive properties such as CMC, methylcellulose, tapioca starch, xanthan gum, guar gum, guar gum derivatives and karaya gum. Among these materials, CMC is preferred. The amount of the tackiness-enhancing agent, based on solids, may range from about 0.001% to 0.2% by weight of the granules and preferably will range from about 0.01% to 0.1% by weight. The level of the tackiness-enhancing agent in the water will depend on the viscosity of solutions of those materials—the levels need to be kept low enough to insure workable or "sprayable" viscosities. For example, the following levels could be used: karaya gum solution 20 g/1000 ml); tapioca starch solution (10 g/1000 ml); xanthan gum solution (8 g/1000 ml); guar gum solution (5 g/1000 ml) and methylcellulose solution (10 g/1000 ml).

The application of the water spray to the xanthan gum-coated cellulosic particles causes the gum to become tacky. Guar gum particles are then dusted onto the tacky surfaces of the wetted, xanthan gum-coated particles. The guar gum is preferably in the form of a powder of less than about 80 mesh and preferably less than about 200 mesh. The level of guar gum pick-up on the xanthan gum-coated particles should be in the range of about 0.5 to 5.0% by weight and preferably about 1% by weight based on the weight of the previously coated particles. Guar gum derivatives, including but not limited to hydroxypropyl guar, carboxymethyl guar and carboxymethyl hydroxypropyl guar, may be used in lieu of guar gum.

Finally, a third aqueous coating may be applied in the form of a solution of one or more of the tackiness-enhancing agents described above. Again, CMC is the preferred tackiness-enhancing agent. This third coating helps tack down any guar gum particles that failed to adhere to the xanthan gum coating. Also, it contributes to the performance of the final product.

The final particles preferably will have a moisture level of about 5 to 10% by weight. Preferably, the moisture level will be about 5 to 6% and most preferably it will be no more than about 5% by weight. If the level of moisture in the particles exceeds these levels, it is preferred that the particles be dried to a moisture level at least as low as 8% by weight before packaging them for shipment and later use. Therefore, in order to minimize or eliminate the need to dry the particles after the coating processes are completed, it is preferred that the total moisture added in the two water sprays described above should not exceed about 7% by weight of the overall coated cellulosic particles and preferably will not exceed about 3.0%. Finally, whether or not drying is required, it is desirable to permit the guar gum-coated particles to "cure" for at least about 1 to 2 minutes before packaging to prevent the particles from sticking together.

Surfactant, at a level of from about 0.05 to 0.50% by weight of the overall coated cellulosic particles and preferably from about 0.075 to 0.10%, should be added to prevent runoff and improve absorption of urine and other aqueous liquids and to enhance clumping. Non-ionic surfactants are preferred, although anionic and cationic surfactants may also be used. Typical useful non-ionic surfactants include Igepal® 60, available from Stepan Co. of Northfield, Ill., Tween®, available from ICI Americas, Inc., of Wilmington, Del., Triton® X-100, which is available from Union Carbide of Houston, Tex. Among these, Triton X-100 is preferred. The surfactant is most conveniently added in one of the water coatings described earlier.

Various adjunct materials besides surfactant may be added to the cellulosic granules. Some of these (such as a biocide) are required in many cases, whereas other adjuncts (such as a coloring agent) are optional. Preferably, the surfactant as well as the other adjuncts are applied before the xanthan and guar gum layers. For example, one or more of the adjuncts may be incorporated into the aqueous mist applied to the cellulosic particles before application of the xanthan gum.

Useful biocides can be chosen from, for example, the following list: quaternary ammonium salts, aldehyde derivatives, carbamates, azo chlorides and thiocyanates. Among these, quaternary ammonium salt (bidecyl dimethyl ammonium chloride), available as Bardac 2250 from Lonza Co. of Fairlawn, N.J. is preferred.

Various commercially available fragrances may be used. The presently preferred fragrance is Green Fresher which is available from Bush Boake and Allen of Mountvale, N.J. This fragrance is described as a fruity floral blend of jasmine and rose accented by fruity and citrus top notes and underscored by a woody and musky base. In a preferred embodiment about 0.05 to 0.25 percent by weight and more preferably about 0.10 percent by weight of fragrance will be used.

The following examples are intended to illustrate the practice of the present invention. They are not intended to be exhaustive or limiting of the invention. Unless otherwise indicated, parts and percentages are by weight.

EXAMPLES

Preparation of Clumping Cellulosic Litter

1. Cellulosic particles prepared in accordance with the teaching of U.S. Pat. Nos. 5,460,527, 4,621,011 and 4,721,059, were obtained from GranTek, Inc., Granger, Ind. The particles were in granular form and available, before treatment in accordance with the present invention, as BIODAC® granules having a mesh size of 12/20.

The BIODAC® particles were emptied into a cement mixer operating at about 25 rpm and passed beneath a spray nozzle which applied blue color at a level of 0.0125% by weight. After the color, a solution containing water, Drom fragrance oil (Chevrefeuille) and nonionic surfactant, was sprayed onto the cellulosic particles at a rate of 40 milliliters per pound of cellulosic particles to achieve levels in the granules of 0.1% fragrance oil, 0.1% surfactant.

Dry xanthan gum having a mesh size of about 100 was then dusted onto the surface of the wetted cellulosic particles at a level of about 2% by weight. The moisture available from the immediately preceding application of the water/fragrance/surfactant solution caused the xanthan glum to adhere to the surface of the cellulosic particles after approximately 30–60 seconds of mixing/tumbling. A second water spray was applied to the xanthan-coated cellulosic particles through the same spray nozzles used to apply the water/fragrance/surfactant solution. This spray, which was applied at a level of 20 ml per pound of cellulosic particles, caused the xanthan-coated cellulosic particles to become tacky. Then, a dry guar gum powder having a mesh size of about 200 was dusted onto the tacky surfaces of the cellulosic particles at a level of about 2% by weight. Due to the amount of moisture added, the cellulosic particles were dried using a fluid bed drier to a moisture level of less than about 5% and then bagged and stored for future use as a cat litter.

2. Another batch of clumping litter was prepared, using the BIODAC® cellulosic particles referred to in Example 1. In this case, less water was introduced during the course of preparing the coated particles in order to minimize or eliminate the need for drying at the end of the preparation process.

The BIODAC® particles were emptied into a cement mixer and passed beneath a spray nozzle which applied blue color at a level of about 0.0125% by weight. After the color, a solution containing water, fragrance oil (Green Fresh), non-ionic surfactant, and biocide (didecyl dimethyl ammonium chloride) was sprayed onto the cellulosic particles. The amount of the fragrance solution sprayed was about 10 milliliters per pound of cellulosic particles to achieve levels in the granules of about 0.10% fragrance oil, 0.10% surfactant, and 0.0035% biocide. Xanthan gum (100 mesh) was then dusted onto the surface of the wetted cellulosic particles at a level of 1% by weight.

A CMC adhesive agent solution (10 g/500 ml of water) was then sprayed onto the cellulosic particles. The amount of solution sprayed was 20 ml per pound of cellulosic particles, to produce levels in the granules of 0.09% by weight of carboxymethylcellulose. The adhesive quality of the adhesive agent reduced the amount of xanthan gum required to achieve roughly the same tackiness achieved in Example 1. Because the xanthan gum-coated surface became tacky without an additional water spray, guar gum was added less than 30 seconds after the addition of the xanthan gum. The amount of guar gum added was 1% by weight. The resulting product, which had an overall moisture content less than in Example 1 (and required much less drying) was bagged and stored for future use as a cat litter.

3. Another batch of clumping litter was prepared beginning by emptying BIODAC® granules into an auger mixer 30 feet in length with an eight inch diameter auger. The speed of the auger was 23 RPM producing a rate of 33 pounds per minute throughput of cellulosic material. The moving mass of BIODAC® granules first encountered a spray nozzle applying blue color at a rate of 0.0125% by weight. This application occurred approximately 1.5 feet from the inlet end of the auger. After traveling to a distance of 4 feet from the inlet end, the moving mass encountered a spray nozzle applying a solution containing water, fragrance oil (Green Fresh), non-ionoc surfactant, and biocide. The rate of application of fragrance solution was adjusted to apply 10 ml per pound of cellulosic material achieving levels in the granule of 0.1% fragrance oil, 0.1% surfactant, and 0.0035% biocide.

At a distance between 5 and 6 feet from the inlet end, xanthan gum (200 mesh) was dusted onto the advancing mass of wetted cellulosic particles at a rate of 1% by weight. Between 7 and 8 feet from the inlet end of the auger the moving mass encountered a second set of spray nozzles operating at a rate of 10 ml per pound again achieving levels in the granule of 0.1% fragrance oil, 0.1% surfactant, and 0.0035% biocide. This second spray created a tacky surface on the xanthan gum-coated particles. At a distance of 9 feet from the inlet end of the auger, guar gum (200 mesh) was dusted onto the tacky particles. The amount of guar gum applied was 1% by weight. Between 10 and 15 feet from the inlet end a solution of CMC (20 g/1000 ml) was sprayed through a set of nozzles. The CMC solution tacked down any guar gum powder that failed to adhere to the xanthan gum coating. The retention time in the remaining 15 feet of the auger was used to allow the granule to "cure". The discharging particles did not require drying and was immediately bagged for future use.

4. The issue of moisture content of the granules and need to dry them after the coating processes are complete was examined by generally following the process described in Examples 1–3 to coat BIODAC® 12/20 granules, using levels of fragrance/surfactant/biocide to achieve levels by weight in the granules respectively of about 0.1%/0.1%/0.0035%. In these tests, a CMC spray at 20 g/1000 ml was used. The results, which are reported in the Table I, show that for every 10 ml of liquid applied per pound of granule the overall moisture of the granule will increase about 1%.

TABLE I

Effects of Moisture Levels on Drying Requirement

| Example | Blue Color | Spray #1 | Xanthan | Spray #2 | Guar | Spray #3 | Particle Moisture | Drying Required |
|---|---|---|---|---|---|---|---|---|
| A | 0.0125% | Fragrance Sol. 40 ml/lb | 2.0% | Water 20 ml/lb | 2.0% | | 8–10% | Yes |
| B | 0.0125% | Fragrance Sol. 30 ml/Ib | 1.5% | CMC Solution 10 ml/lb | 1.5% | | 6–8% | Yes |
| C | 0.0125% | Fragrance Sol. 10 ml/lb | 1.0% | CMC Solution 20 ml/lb | 2.0% | | 6–7% | Border Line |
| D | 0.0125% | Fragrance Sol. 10 ml/lb | 1.0% | CMC Solution 10 ml/lb | 1.0% | CMC Solution 10 ml/lb | 5–7% | No |
| D | 0.0125% | Fragrance Sol. 10 ml/lb | 1.0% | Fragrance Sol. 10 ml/lb | 1.0% | CMC Solution 4 ml/lb | 5–7% | No |

Use As Cat Litter

5. As noted above, it is preferred that the xanthan and guar gums be present in a ratio of about 1:1 by weight. As demonstrated below, when more guar gum is coated onto the granules than xanthan gum, some of the guar gum will not adhere to the granules. This excess guar gum will fall to the bottom of the litter box, producing dust and causing sticking to the bottom of the box.

In this example, a 20 lb. BIODAC® 12/20 sample was used, with coating proceeding as in Example 3. The results are reported in Table II.

TABLE II

| Xanthan Gum | | Guar Gum | | Screen Analysis (without third CMC spray) | Screen Analysis (with third CMC spray) |
|---|---|---|---|---|---|
| % added | grams | % added | grams | −100 mesh | −100 mesh |
| 1.0 | 90.80 | 0.75 | 68.10 | .03 | <.01 |
| 1.0 | 90.80 | 1.0 | 90.80 | .10 | .03 |
| 1.0 | 90.80 | 1.25 | 113.30 | 23.12 | 21.47 |
| 1.25 | 113.30 | 1.0 | 90.80 | .02 | <.01 |
| 1.25 | 113.30 | 1.25 | 113.30 | .18 | .05 |
| 1.25 | 113.30 | 1.50 | 136.00 | 24.02 | 23.48 |
| 1.50 | 136.00 | 1.25 | 113.30 | .05 | .03 |
| 1.50 | 136.00 | 1.50 | 136.00 | .09 | .04 |
| 1.50 | 136.00 | 1.75 | 158.70 | 23.48 | 23.37 |

TABLE II-continued

| Xanthan Gum | | Guar Gum | | Screen Analysis (without third CMC spray) | Screen Analysis (with third CMC spray) |
|---|---|---|---|---|---|
| % added | grams | % added | grams | −100 mesh | −100 mesh |
| 1.75 | 158.70 | 1.50 | 136.00 | .05 | .03 |
| 1.75 | 158.70 | 1.75 | 158.70 | .11 | .04 |
| 1.75 | 158.70 | 2.0 | 181.40 | 23.12 | 23.05 |
| 2.0 | 181.40 | 1.75 | 158.70 | .04 | <.01 |
| 2.0 | 181.40 | 2.0 | 181.40 | .12 | .05 |
| 2.0 | 181.40 | 2.25 | 204.10 | 23.56 | 22.99 |

The results reported in Table II demonstrate that when the level in the coatings of guar gum is less than or equal to the level of xanthan gum, there is little or no guar gum loss. However, when the level in the coatings of guar gum exceeds the level of xanthan gum, there is a significant loss of guar gum.

6. The product of Example 1 was placed in a conventional cat litter box. Use of the box was monitored, so that immediately after the litter was wetted by a urinating cat, the litter was examined. Certain criteria were established for evaluating this material. These included a requirement that a coherent clump be formed within sixty seconds after the application of urine and that the resulting clump be sufficiently coherent that it could be easily segregated and removed from the remaining absorbent without leaving any residual wetted material.

It was found that the urine was absorbed in well-defined litter clumps. These clumps were removed after at least 60 seconds following wetting and after sitting overnight using a small scoop of the type typically used with clumping clay-based absorbents. The clumps removed after 60 seconds were found to be well-formed and coherent so that no wetted-absorbent remained in the litter box. The clumps removed after sitting overnight were found to be much harder than clumps produced in clay litters. This was identified as a particularly desirable advantage over clay litters since these hard clumps resisted break-up due to movement of the cat in the litter box, which is a recognized problem with clay litter. The clumps adhered to fecal matter as well as clay-based litters. The litter box was permitted to stand for two weeks during which it was monitored and found to be odor-free.

Comparative Testing.

7. Comparative testing was undertaken to evaluate the performance of absorbents prepared in accordance with the invention to clay-based clumping litters. This was done by providing cat owners who normally use commercial clay-based clumping litters with samples of cellulosic absorbent prepared in accordance with Example 1. The results of this testing is reported in Table III as follows:

TABLE III

Example 1 Product vs. Commercial Clumpable Clay Product

| | Example 1 Product Better | Both the Same | Commercial Product Better |
|---|---|---|---|
| Ease of scooping liquid waste | 58% | 23% | 18% |
| Ease of scooping solid waste | 54% | 35% | 10% |
| Ability to control odor for extended period | 72% | 17% | 11% |
| Absorption | 37% | 56% | 7% |
| Amount of dust created | 63% | 28% | 8% |
| Cats' acceptance | 38% | 47% | 15% |
| Overall performance | 62% | 18% | 13% |

Additionally, 59% of the respondents indicated that clump strength of the Example 1 product was excellent or very good and 51% indicated that case of clump removal was excellent or very good.

Figure 2:
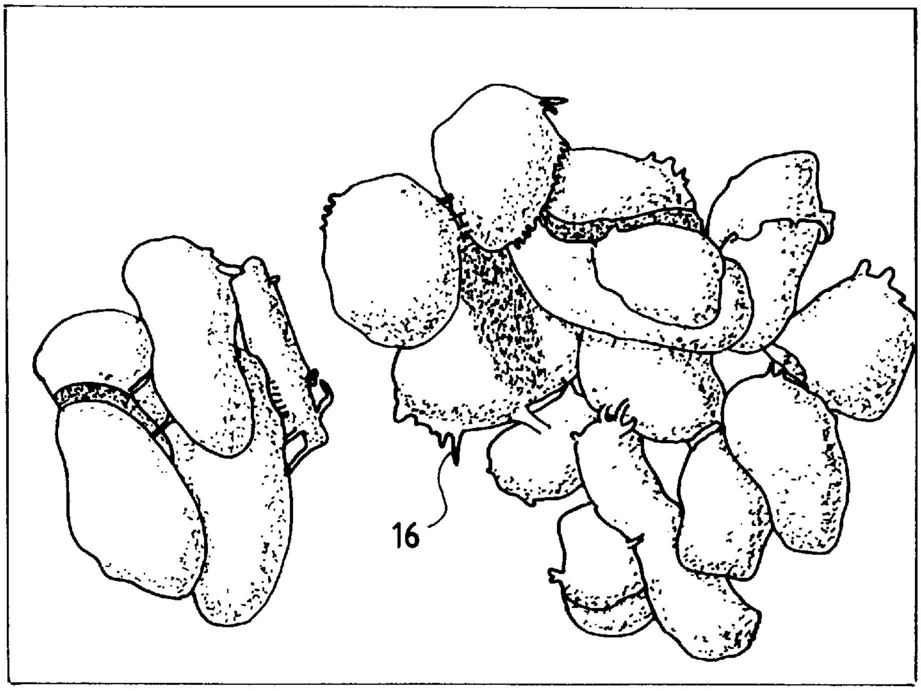
FIG. 2 is a photomicrograph of a group of another group of particles prepared in accordance with the present invention at least 60 seconds after they were wetted by cat urine, also at a magnification of about 10×.

8. Samples of particles prepared in accordance with Example 1 were photographed at about 10× magnification before wetting with cat urine (FIG. 1) and at least 60 seconds after wetting (FIG. 2). The particles before wetting 10, have smooth, rounded surfaces 12 with pores 14 and are generally spaced from one another. After wetting, the granules clump together as the guar and xanthan coatings become tacky and, it is believed, as portions of the coating wash down into pockets between adjacent granules while string fibers 16 erupt from the coated surfaces of the granules to bridge the gaps between adjacent granules to produce a matrix between the granules insuring a tight, coherent mass or clump.

While the present invention is described above in connection with preferred or illustrative embodiments, these embodiments are not intended to be exhaustive or limiting of the invention. Rather, the invention is intended to cover all alternatives, modifications and equivalents which may be included within its spirit and scope, as defined by the appended claims.

What we claim is:

1. A clumping cellulosic animal litter comprising:

a plurality of cellulosic particles having a first coating of xanthan gum and a second coating of guar gum.

2. The cellulosic animal litter of claim 1 in which the cellulosic particles contain at least 40% of cellulosic content.

3. The cellulosic animal litter of claim 1 in which the cellulosic particles contain at least 50% of cellulosic content.

4. The cellulosic animal litter of claim 1 in which the cellulosic particles are derived from primary paper sludge or a combination of primary and secondary paper sludge.

5. The cellulosic animal litter of claim 1 in which the cellulosic particles are in granular form.

6. The cellulosic animal litter of claim 5 in which the cellulosic particles are from about 4 to 60 mesh in size.

7. The cellulosic animal litter of claim 5 in which the cellulosic particles are from about 12 to 20 mesh in size.

8. The cellulosic animal litter of claim 1 in which the cellulosic particles are in pellet form.

9. The cellulosic animal litter of claim 1 in which the levels by weight of xanthan gum and guar gum in the coatings are about equal.

10. The cellulosic animal litter of claim 1 including a third coating of a tackiness-enhancing agent chosen from the group consisting of CMC, methylcellulose, tapioca starch, xanthan gum, guar gum, guar gum derivatives, and karaya gum.

11. The cellulosic animal litter of claim 10 in which the tackiness-enhancing agent is CMC.

12. The cellulosic animal litter of claim 1 including a surfactant.

13. The cellulosic animal litter of claim 12 in which the surfactant is a non-ionic surfactant.

14. The cellulosic animal litter of claim 1 including an anti-microbial agent.

15. The cellulosic animal litter of claim 1 in which the anti-microbial agent is chosen from the group consisting of quaternary ammonium salts, aldehyde derivatives, carbamates, azo chlorides and thiocyanates.

16. The cellulosic animal litter of claim 1 including a fragrance.

17. The cellulosic animal litter of claim 1 including a coloring agent.

18. A method of making a clumping cellulosic animal litter comprising:

providing a substrate comprising cellulosic particles;

wetting the surface of the cellulosic particles with water;

applying xanthan gum to the wetted surface of the particles;

wetting the xanthan gum-coated particles with water; and applying guar gum to the wetted surface of the particles.

19. The method of claim 18 in which the cellulosic particles are derived from primary paper sludge or a combination of primary and secondary paper sludge.

20. The method of claim 18 in which the cellulosic particles are in granular form.

21. The method of claim 18 in which the cellulosic particles are from about 12 to 20 mesh in size.

22. The method of claim 18 in which the levels by weight of xanthan gum and guar gum in the coatings are about equal.

23. The method of claim 18 in which the first water coating is applied at a level of from about 1 to 6% by weight of water based on the weight of the particles.

24. The method of claim 18 in which the first water coating is applied at a level of from about 1 to 2% by weight of water based on the weight of the particles.

25. The method of claim 18 in which more than about 15 seconds elapse between the application of the first water coating and the application of the xanthan gum.

26. The method of claim 18 in which the xanthan gum is in the form of a dry powder less than about 80 mesh in size.

27. The method of claim 18 in which the xanthan gum is in the form of a dry powder less than about 200 mesh in size.

28. The method of claim 18 in which from about 0.25 to 5% by weight xanthan gum is applied to the cellulosic particles.

29. The method of claim 18 in which from about 1% by weight xanthan gum is applied to the cellulosic particles.

30. The method of claim 18 in which the second water coating is at a level sufficient to supply about 0.25 to 2% by weight moisture to the xanthan gum-coated particles.

31. The method of claim 18 in which the second water coating is at a level sufficient to apply about 0.70 to 1.25% by weight moisture to the xanthan gum-coated particles.

32. The method of claim 18 in which the guar gum is in the form of a powder of less than about 80 mesh in size.

33. The method of claim 18 in which the guar gum is in the form of a powder of less than about 200 mesh in size.

34. The method of claim 18 in which about 0.5 to 5% by weight guar gum is applied to the cellulosic particles.

35. The method of claim 18 in which about 1% by weight guar gum is applied to the cellulosic particles.

36. The method of claim 18 in which the particles are dried to a moisture level of about 5 to 8% water after the coating process is completed.

37. The method of claim 18 in which the particles are dried to a moisture level of less than about 5% water.

38. The method of claim 18 in which adjuncts are added to the water used to wet the surface of the particles before application of the xanthan or guar gums, the adjunct being chosen from the group consisting of antimicrobial agents, fragrances, coloring agents, and surfactants.

39. The method of claim 18 in which there is added to the water used to wet the surface of the particles after application of the xanthan gum a tackiness-enhancing agent chosen from the group consisting of CMC, methylcellulose, tapioca starch, xanthan gum, guar gum, guar gum derivatives, and karaya gum.

40. The method of claim 39 in which the tackiness-enhancing agent is CMC.

41. The method of claim 18 in which after the application of the guar gum there is applied a third coating of an aqueous solution of a tackiness-enhancing agent chosen from the group consisting of CMC, methylcellulose, tapioca starch, xanthan gum, guar gum, guar gum derivatives, and karaya gum.

42. The method of claim 41 in which the tackiness-enhancing agent is CMC.

43. A method of making a clumping cellulosic animal litter comprising:

providing a substrate comprising cellulosic granules containing at least 40% by weight cellulosic content;

wetting the surface of the cellulosic granules with water;

applying about 0.25 to 5% by weight xanthan gum to the wetted surface of the granules;

wetting the xanthan gum-coated granules with water; and applying an amount of guar gum to the wetted surface of the granules about equal in weight to the weight of the xanthan gum.

44. A clumping cellulosic animal litter comprising:

a plurality of cellulosic particles having a first coating of xanthan gum and a second coating of a guar gum derivative.

45. A method of making a clumping cellulosic animal litter comprising:

providing a substrate comprising cellulosic particles; wetting the surface of the cellulosic particles with water; applying xanthan gum to the wetted surface of the particles; wetting the xanthan gum-coated particles with water; and applying a guar gum derivative to the wetted surface of the particles.

* * * * *